Oct. 27, 1925.

H. R. STRAIGHT 1,559,199

MECHANISM FOR HANDLING TILE BEARING PALLETS

Filed Sept. 25, 1923

Inventor
Halus R. Straight
by
Owing & Hague, Attys.

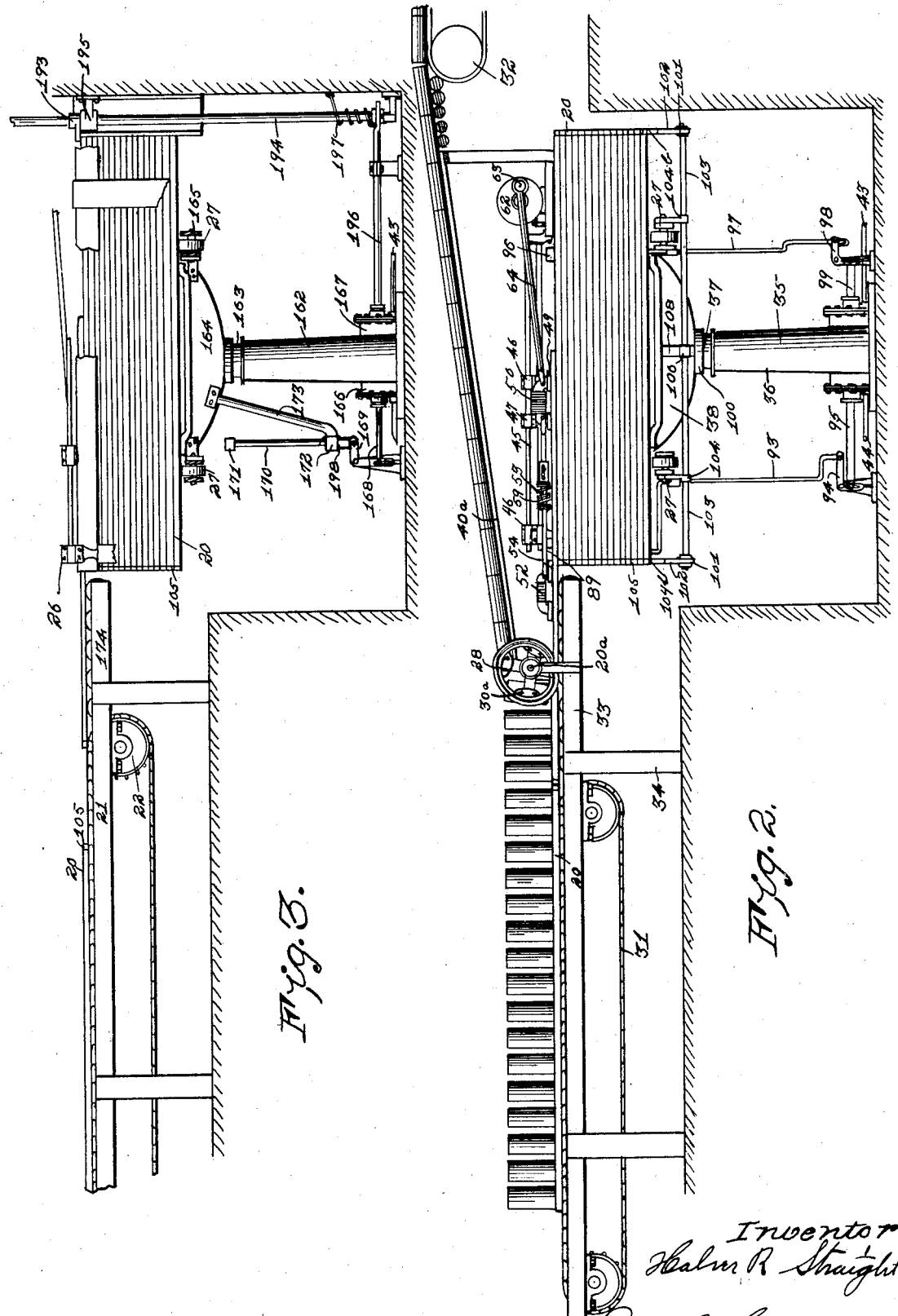

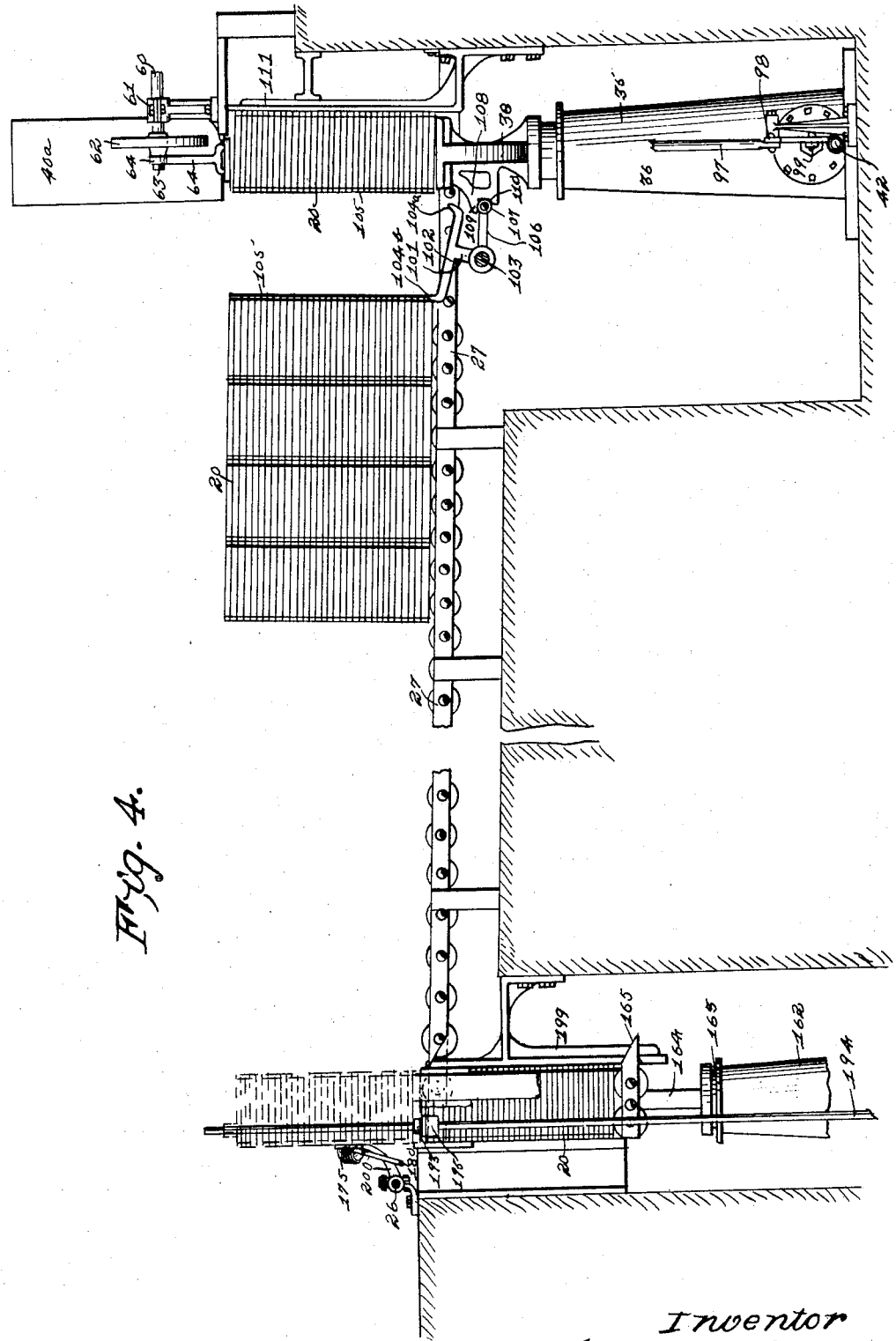

Oct. 27, 1925.
H. R. STRAIGHT
1,559,199
MECHANISM FOR HANDLING TILE BEARING PALLETS
Filed Sept. 25, 1923 7 Sheets—Sheet 4
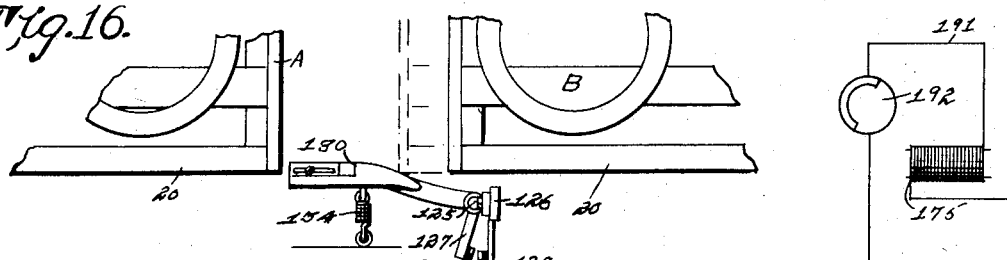
Fig.16.
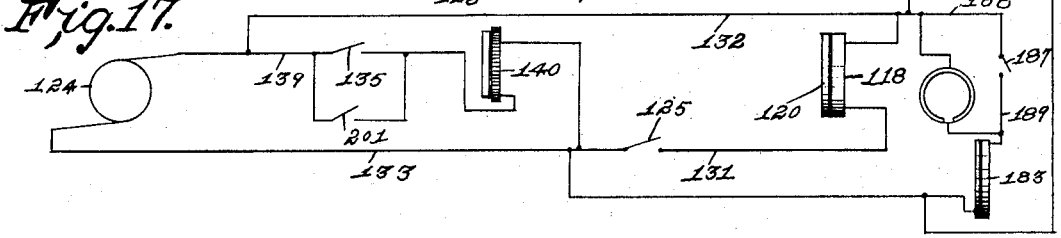
Fig.17.
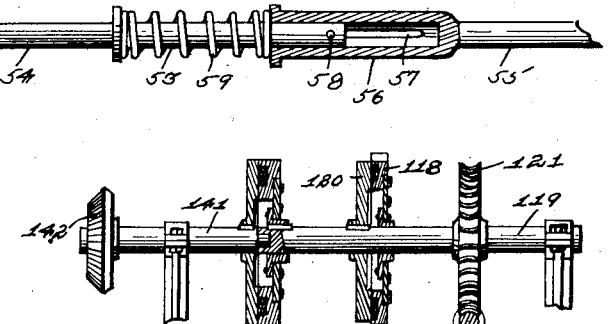
Fig.18.
Fig.19.
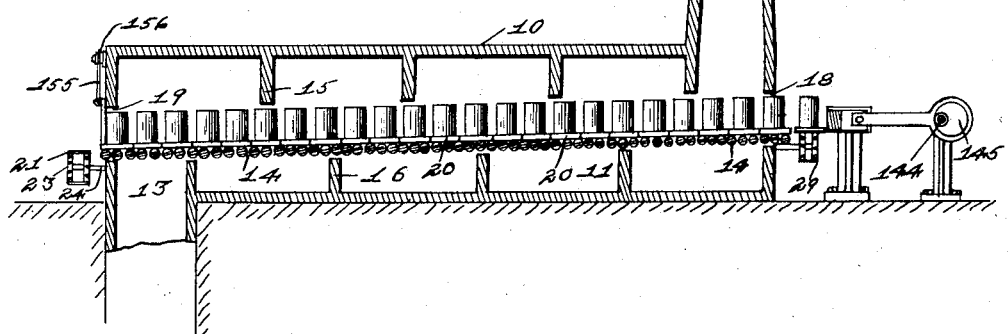
Fig. 5
Inventor
Halver R. Straight.
by Orwig & Hague Att'ys.

Oct. 27, 1925.
H. R. STRAIGHT
1,559,199
MECHANISM FOR HANDLING TILE BEARING PALLETS
Filed Sept. 25, 1923 7 Sheets-Sheet 5
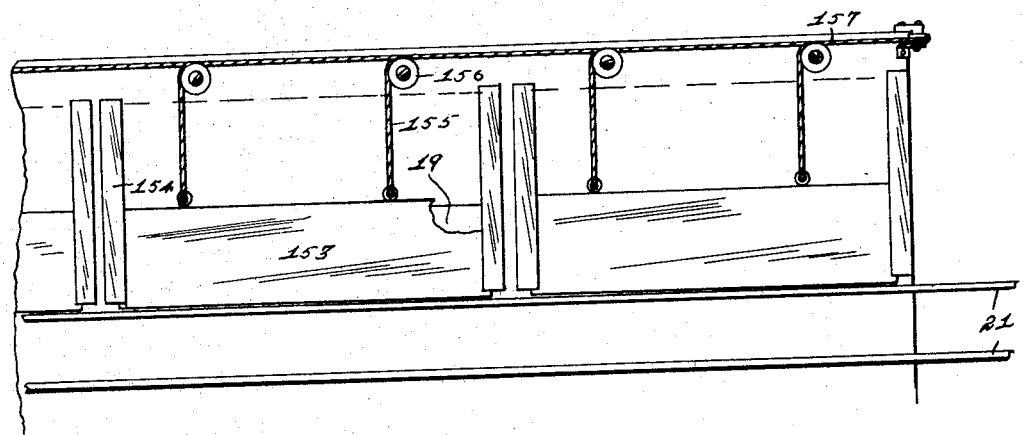
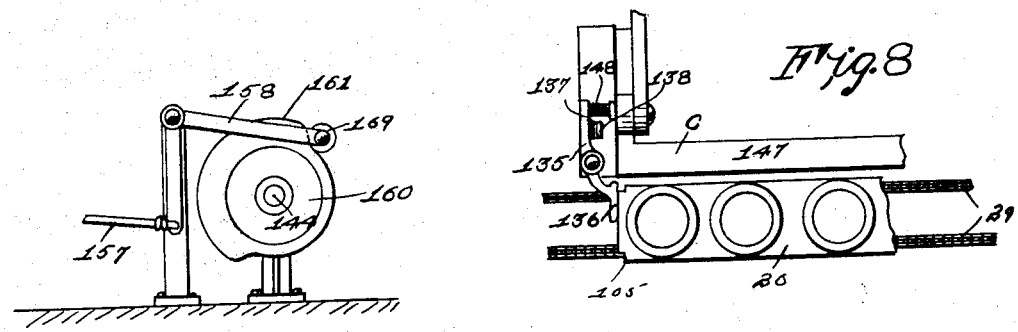
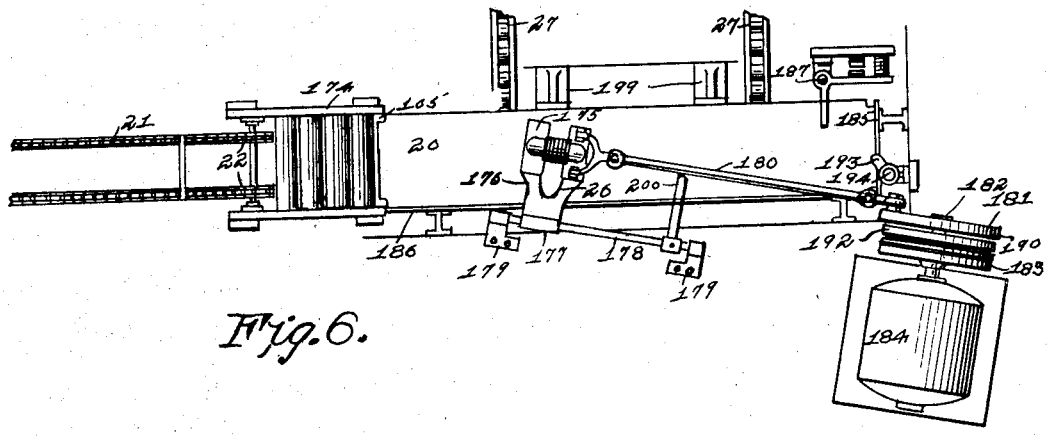
Inventor
Halver R. Straight
by Orwig & Hague, Att'ys.

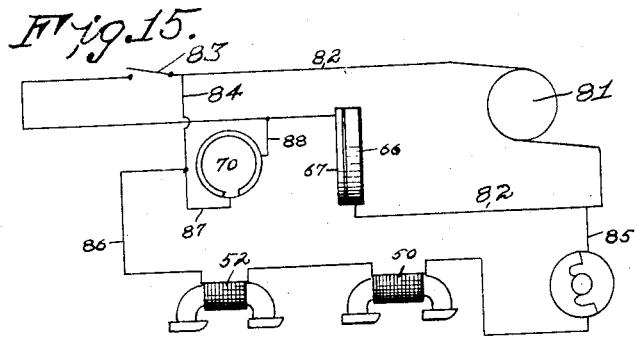

Oct. 27, 1925.

H. R. STRAIGHT

MECHANISM FOR HANDLING TILE BEARING PALLETS

Filed Sept. 25, 1923    7 Sheets-Sheet 7

1,559,199

Inventor
Halver R. Straight
by Orwig & Hague, Att'ys.

Patented Oct. 27, 1925.

1,559,199

UNITED STATES PATENT OFFICE.

HALVER R. STRAIGHT, OF ADEL, IOWA.

MECHANISM FOR HANDLING TILE-BEARING PALLETS.

Application filed September 25, 1923. Serial No. 664,713.

*To all whom it may concern:*

Be it known that I, HALVER R. STRAIGHT, a citizen of the United States, and a resident of Adel, in the county of Dallas and State of Iowa, have invented a certain new and useful Mechanism for Handling Tile-Bearing Pallets, of which the following is a specification.

This invention relates to improvements in mechanisms designed to be used in connection with the manufacture of plastic ware such as drain tile or hollow building tile. More specifically to that part of the mechanism which has to do with the handling of the plastic tile as it leaves the tile machine and is delivered therefrom to the drier and to the burning kiln.

The object of my invention is to provide a mechanism of comparatively simple, durable and inexpensive construction so arranged and constructed that plastic tile may be received from the delivery end of a tile cutting machine and automatically carried to the drier kiln, the mechanism for operating said automatic device being controlled by the movement of the tile as it is delivered thereto.

More specifically it is the object of my invention to provide in connection with an off-bearing mechanism such as adapted to automatically receive and deliver tile from the tile cutter, improved mechanism for automatically delivering plastic tile to the drier kiln, the said automatic mechanism including a series of pallets each of which comprises a series of spaced bars for permitting ventilation, the pallets being designed to be moved successively in the proper positions whereby they will be made to receive tile from the off-bearing mechanism, such tile being placed preferably in an upright position. The mechanism for handling the pallets is so arranged that the pallets may be automatically moved into position relative to the off-bearing mechanism, and thence carried automatically to the drier kiln, and moved automatically through the drier kiln to a discharge conveyor, from thence they are moved automatically to a point where they are fed to the off-bearing mechanism.

A further object is to provide in a mechanism adapted to handle tile bearing pallets in a continuous and successive manner, improved means whereby a portion of the pallets may be stacked in groups or piles so that one part of the mechanism may be permitted to operate in case the other portion is closed down.

A further object is to provide in such a device an improved mechanism for stacking the pallets.

A further object is to provide an improved mechanism for delivering the pallets from the stack to the off-bearing mechanism.

A further object is to provide in connection with the mechanism above described, improved means for carrying the pallets to the drier kiln and for opening and closing the entrance to the said kiln as the tile are being admitted or discharged.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved mechanism showing the manner in which it is applied to the drier kiln of a tile manufacturing plant.

Figure 2 is a side elevation of the off-bearing mechanism connected to one end of a tile cutting machine, showing the manner in which a portion of my improved mechanism is mounted to receive the plastic tile from said off-bearing mechanism, said figure showing the mechanism for handling a stack of pallets and delivering the pallets consecutively to a working position adjacent to the discharge end of the off-bearing mechanism.

Figure 3 is an enlarged detail view showing in elevation a portion of the mechanism for stacking the pallets.

Figure 4 is an enlarged detail sectional segmental view taken on the line 4—4 of Figure 1.

Figure 5 is a transverse sectional view taken through the drier kiln on the line 5—5 of Figure 1.

Figure 6 is an enlarged detail plan view of the pallet stacking mechanism.

Figure 7 is a detail segmental view of the discharge end of the drier kiln showing the manner in which the discharge doors are mounted therein.

Figure 8 is an enlarged detail view of one of the switch devices used in my improved mechanism.

Figure 9 is an enlarged view of the cam mechanism for automatically operating the discharge doors of the drier kiln.

Figure 10 is a detail side elevation of the magnetic pallet feeding mechanism.

Figure 11 is a plan view of Figure 10.

Figure 12 is a side elevation of the mechanism for operating and controlling the said magnetic feed device.

Figure 13 is a detail view taken on the line 13—13 of Figure 12.

Figure 14 is a detail sectional view taken on the line 14—14 of Figure 12.

Figure 15 is a diagrammatic view of the electric circuit for controlling the feeding mechanism.

Figure 16 is a detail view showing the switch control mechanism for the mechanism designed to move the pallets from the receiving position to a position where they may be fed into the drier kiln.

Figure 17 is a diagrammatic view of the electric circuit for controlling the pallet advancing mechanism.

Figure 18 is an enlarged detail sectional view of a segment of the connecting rod for the two magnetic units of the feeding mechanism.

Figure 19 is a detail sectional view of the mechanism for operating the main drive shaft of the pallet advancing mechanism.

Figure 1:
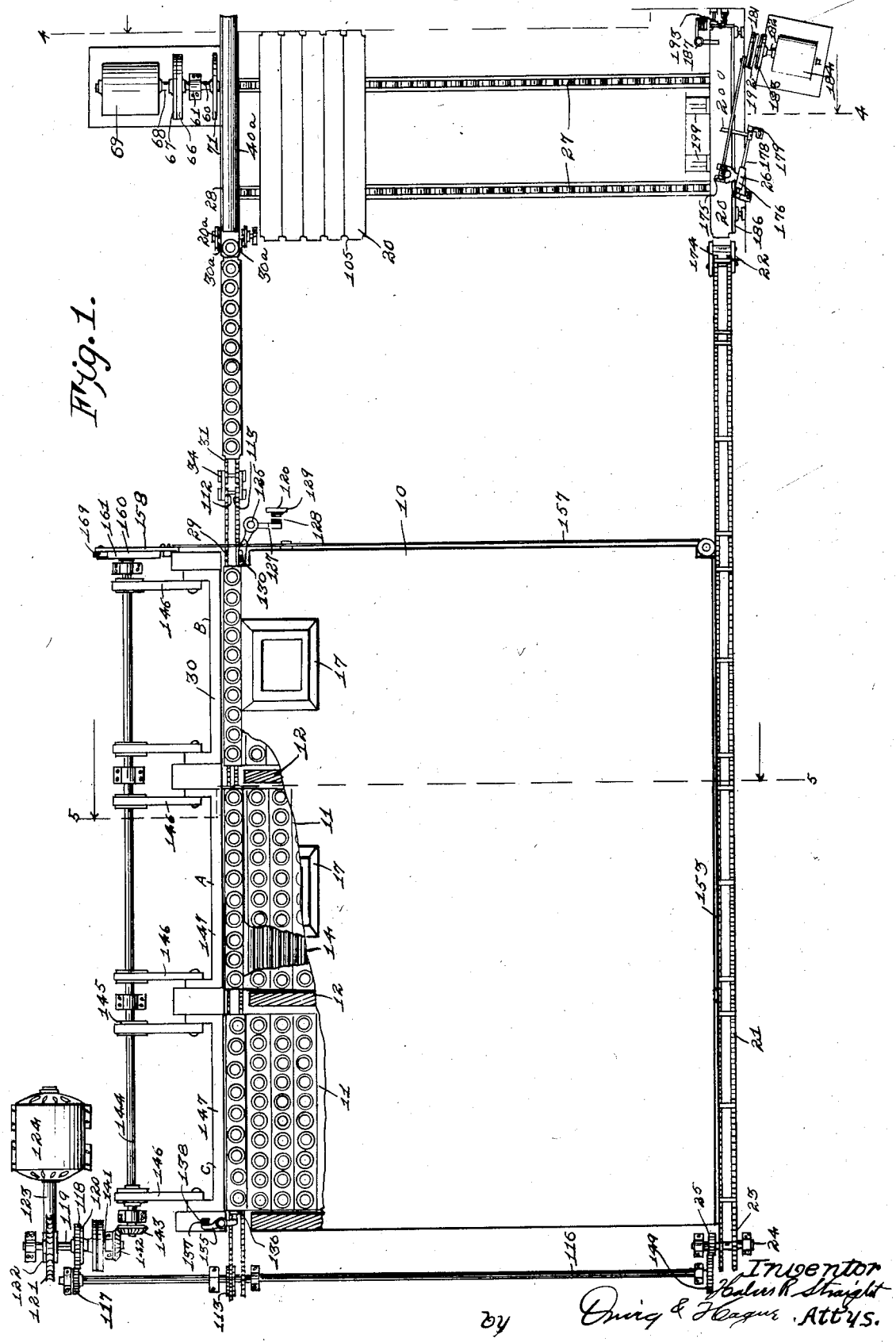
Figure 20:
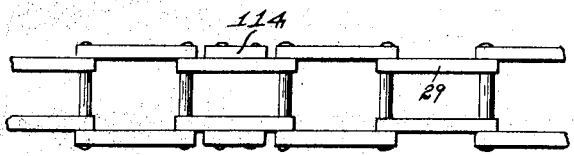
Figure 20 is a plan view of a segment of one of the pallet advancing chains.

Referring to Figure 1 of the drawings, the numeral 10 indicates a drier kiln which may be formed with a number of compartments 11. In the drawings I have illustrated three of these compartments. The said compartments are separated by partitions 12 which extend longitudinally through the drier kiln. The kiln is provided with a conductor 13 through which hot air may be admitted to the kiln, preferably at the back end.

Each of the compartments of the kiln is provided with a series of tracks 14, each of which comprises a series of rollers, the tracks being slightly inclined from the receiving end to the discharge end and spaced apart as clearly shown in Figure 1. The said kiln is provided with a series of partitions 15 and 16 above and below the track 14. The partitions 15 and 16 are arranged in staggered relation with each other, the inner edges of said partitions being spaced apart so that a row of tile may be moved longitudinally through the kiln between the said edges, which provides means whereby a current of air entering the conductor 15 may be moved upwardly and downwardly through the row of incoming tile and finally discharged through the stack 17. This arrangement is clearly shown in Figure 5 of the drawings.

The right hand view of the kiln 10 as shown in Figure 5 is provided with an inlet opening 18 through which the tile are designed to enter, and with a discharge opening 19 through which they are discharged. The track 14 is designed to carry a series of pallets 20, the said pallets being preferably about ten inches wide and about ten feet long and arranged to travel on the tracks 14 with the said pallets transverse with their movement through the kiln.

Thus it will be seen that if a pallet is fed into the intake opening 18 of the kiln 10, it may be moved through the said kiln either by gravity or by being pushed through by the next incoming pallet. Each of the pallets is designed to carry a series of tile arranged thereon in an upright manner as illustrated. This operation may be continued until the kiln is filled, after which the pallets will be discharged through the opening 19 as one is being fed through the opening 18.

I have provided a conveyor 21 which extends longitudinally with the back side of the kiln and just beneath the discharge openings 19 in such a manner that the discharged pallets may be received thereon. This conveyor I shall term the pallet receiving conveyor. The said conveyor 21 may be formed of either chain or a belt and is mounted on suitable pulleys 22 at one end and its opposite end provided with sprockets 23, said sprockets being mounted on a shaft 24, one end of which is provided with a gear 25, providing means whereby the conveyor may be operated so that the pallets thereon may be moved from the pulleys 23 toward the pulley 22, as shown in Figure 1, to a stacking mechanism 26 for stacking the pallets in piles, as clearly shown in Figure 3. After a stack has been formed, the stack may be delivered to a conveyor 27, which I shall term the accumulator. The said conveyor consisting of simply a gravity conveyor so inclined that the stack of pallets will be moved from the stacker 26 in a path parallel to the end of the drier kiln 10, and to a position adjacent to the off-bearing mechanism 28, as shown in Figures 1 and 2. The off-bearing mechanism 28 being the same as the one illustrated and described in my co-pending application filed May 22, 1923, Serial Number 640,658.

The said off-bearing mechanism is arranged in line with the receiving end of the kiln, having alinement with a conveyor 29 which is located adjacent to the receiving end of said kiln and beneath the intake opening 18. The conveyor 29 I shall term the pallet advancing conveyor. The said conveyor is designed to receive pallets loaded with tile that are discharged from the off-bearing mechanism and to convey them to positions in front of the intake opening 18.

The pallets are fed into the kiln by a kiln feeding mechanism 30 and the pallets moved from the stacks of pallets adjacent to the off-bearing mechanism to an operative position beneath the discharge end of the off-bearing mechanism to a belt conveyor 31, thereby providing a mechanism so arranged that a given pallet may be fed from a stack of pallets beneath the off-bearing mechanism to a position whereby the tile may be received therefrom, and the pallet carried to the pallet advancing conveyor to a position in front of the kilns where they will be automatically fed through the kiln to the delivery conveyor, and thence to the stacking mechanism and from there to the original starting point, making a continuous operation of the pallets automatically handled by mechanism as hereinafter described.

The various mechanisms for accomplishing this will be described as follows:

Commencing with the off-bearing mechanism 28, which is similar to my co-pending application above referred to, said mechanism being provided with a shaft 20ª and rotatively mounted gripper members 30ª designed to receive tile from an inclined conveyor 40ª, said conveyor being mounted adjacent to the delivery end of the tile cutting machine 32.

Mounted immediately beneath the off-bearing mechanism 28 I have provided a horizontally arranged roller conveyor 33 adjacent to the receiving end of the pallet conveyor 31. The conveyor 33 and the belt conveyor are mounted on a suitable frame 34. Mounted beneath the inclined chute 40ª I have provided a hydraulic lift 35 which comprises a cylinder 36 having a plunger or piston 37, the upper end of said plunger being provided with a supporting arm 38 of a width substantially equal to the width of the pallet and of a length equal to substantially one-half the length of the pallet.

The lower end of the cylinder 36 is provided with an inlet port 39 and an outlet port 40. Said port 40 is provided with a balance valve 41 and the inlet port with a balance valve 42. The valve 41 is designed to communicate with an exhaust pipe 43, while the valve 42 is designed to communicate with an inlet pipe 44, which is in communication with a supply tank not shown, whereby the plunger 37 may be elevated or lowered by hydraulics, the plunger being moved upwardly when the valve 42 is moved to its open position and permitted to lower when the valve 41 is moved to its open position.

Thus it will be seen that by actuating the valves 41 and 42, the plunger 36 may be made to move upwardly or downwardly. The member 38 is designed to move downwardly between the accumulating conveyors 27 and below their top surfaces in such a manner that a stack of pallets may be moved to position over the member 38, as clearly shown in Figure 2.

Mounted above the stack of pallets carried by the member 38 and beneath the conveyor 40ª I have provided means whereby the pallets may be advanced endways and successively from the top of the stack to the conveyor 33. This mechanism comprises a pair of tracks 45, best shown in Figures 10 and 11, said tracks being supported by suitable frame members 46.

Slidably mounted on the tracks 45 is a pair of cross heads 47, each of which is provided with a bracket 48 formed of non-magnetic material. Each of the brackets 48 is designed to carry a magnetic armature 49 provided with an electromagnet 50. Each of the magnets 49 has one edge curved at 51 so as to form a sort of runner designed to slide over the top of the pallets which are formed of magnetic material such as wrought iron. The magnet 50 is placed substantially midway over the top of the stack of pallets, as clearly illustrated in Figure 2.

Over the receiving end of the conveyor 33 I have provided a second magnet 52 similar to the magnet 50, the two magnets being operatively connected with each other by means of a link 53 having members 54 and 55. The member 55 carries a sleeve 56 designed to receive the inner end of the member 54, said sleeve having a slot 57 designed to receive a pin 58 from the member 57. The slot 57 is designed to limit the sliding movement of the member 57 within the sleeve. A spring 59 is designed to hold the member 57 to its outer limit of movement.

Mounted adjacent and above the outer end of the stack of pallets I have provided a shaft 60' mounted in bearings 61 and illustrated in Figure 12. The said shaft has its outer end provided with a crank wheel 62 designed to carry the crank pin 63, said pin being designed to carry a connecting rod 64, one end of which is pivotally connected to the magnet 50. It will be seen that if the shaft 60 is rotated, the magnets 50 and 52 will be reciprocated longitudinally with and above the pallets. The crank pin 63 is detachably secured in the crank wheel 62 in such a manner that the throw of the connecting rod 64 may be varied, this being preferably accomplished by placing the pin 63 in a radial slot 65.

It will be seen that if the magnets 50 and 52 are reciprocated, and during the reciprocation after they are energized by an electric current, the pallets may be made to follow the magnet. The magnets are energized while they are moved toward the off-bearing mechanism 28, and demagnetized as they are moved in the opposite direction, which provides means whereby the pallets may be advanced intermittently and beneath the off-bearing mechanism onto the conveyor 33.

The shaft 60 is provided with a magnetic clutch member 66 designed to coact with the clutch member 67 on the outer end of the motor shaft 68 of the motor 69. It will be seen that the shaft 60 may be rotated with the motor 69 by simply operating the clutch members 66 and 67. Mounted on the shaft 60 I have provided a timer disk 70, illustrated in Figure 13, said disk being formed of insulating material and has its periphery provided with a conducting ring 71. The ends of the rings 71 being separated by a lock 72. A spring contact member 73 is provided and mounted on an insulating block 74. A second disk 75 is provided and illustrated in Figure 14, which is also formed of insulating material having a segment of a conductor ring 76 on its periphery, and one face of the disk 75 is provided with a conductor segment 77, the segment having the same diameter as the disk 75 and is adjustably mounted thereon by set screws 78.

A contact spring 79 is provided on an insulating block 80 which is designed to engage either or both of the segments 76 or 77 as the disk 75 is rotated. It will be seen that the contact 79 will first engage the segment 77 and then the segment 76. By adjusting the segment 77 relative to the segment 76 the electric circuit in which the said segments are included may be closed in greater or less time.

Figure 22:
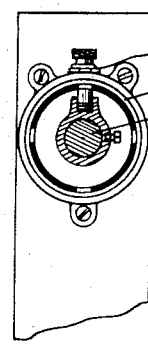
Figure 22 is a detail sectional view of the electric timer or switch device designed to be applied to the rotary shaft of the off-bearing mechanism, said timer being designed to control the pallet feed mechanism.

Referring to Figure 15, the circuit in which these devices are included is therein illustrated. In this circuit the numeral 81 indicates a generator provided with a conductor 82 having a timer switch 83 mounted on one end of the shaft $20^a$ of the off-bearing mechanism 28. This timer is illustrated in Figure 22 and so arranged that as the tile is delivered from the off-bearing mechanism to the pallet, the contact of the switch 83 will be closed at the time the tile is being delivered from the off-bearing mechanism to the pallet. When the circuit has thus been closed, a current will be established through the conductor 82 through the clutch member 66. This will cause the shaft 60 to be rotated and also the contact disks 70 and 75, establishing a circuit through the conductors 85, the members 76 and 78, the magnets 50 and 52 and the conductor 86 through the conductor 84. The conductor plate 70 will also be rotated, causing the contact 73 to make contact with the member 71 and establishing a circuit through the conductors 87 and 88, about which time the switch 83 will be broken, due to the movement of the rotary switch device 83. The rotation of the shaft 60 will cause the magnets 50 and 52 to be moved toward the off-bearing mechanism. The magnets being magnetized will cause the pallets beneath them to be also advanced. The amount of this advancement is determined by the throw of the crank pin 63 which is adjustably mounted in the slot 65. When the magnets have advanced the limit of their forward movement, the contact 79 will disengage the conductor members 76 and 77 and the circuit through the magnets 50 and 52 broken.

The return stroke of the magnets may then be made without returning the pallet. When the return stroke has been completed, the contact 73 of the switch device 70 will be moved into engagement with the insulating lock 72 and the circuit through the clutch 66 broken.

By this arrangement it will be seen that the pallets may be intermittently fed beneath the off-bearing mechanism until the top pallet is entirely on top of the conveyor 33, at which time the head 38 will be elevated a distance equal to the thickness of the pallet, this being accomplished by mechanism hereinafter described. It will be seen that during the interval while the stack is being elevated, the pallet will be advanced a distance equal to several spaces of a block carried thereon. This means that the back end of the pallet on the conveyor 33 will be spaced from the front end of the next pallet which is on the stack a considerable distance.

It is desirous that this space be made up again so that the ends of the pallets as they are fed onto the conveyor 33 will be adjusted to each other so as to form proper spacing of the tile thereon. I have accomplished this by providing the telescopic arrangement between the members 54 and 55. During the time while the stack of pallets is being elevated, the magnet 50 is supported by means of the cross heads 47 a distance above the pallets on the said stack, so at this time there is no action between the magnet 50 and the pallet beneath it. The pallet on the conveyor 33 is advanced by the magnet 52. As soon as the stack has been elevated to its upper limit of movement, the top pallet will engage the under surface of the armature 51, and on the next forward stroke of the magnets, both of the pallets will be advanced.

It will be seen, however, that the pallet on the stack will be advanced faster than the pallet on the conveyor, due to the fact that the stroke of the magnet 50 is slightly greater than the stroke of the magnet 52. Such difference in strokes is equal to the length of the slot 57. The resistance of the spring 59 is such that the said spring will yield before moving the magnet 52 forwardly. It will be seen that a slight variation will result in the spacing of the tile on the pallets due to this action, but this is not objectionable due to the fact that this variation is approximately one-eighth of an inch.

Figure 24:
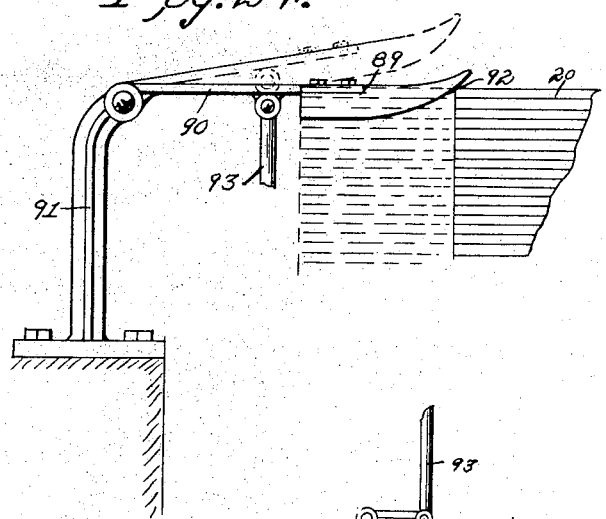
Figure 24 is an enlarged detail view of one of the valve controlling trip mechanisms.
Figure 23:
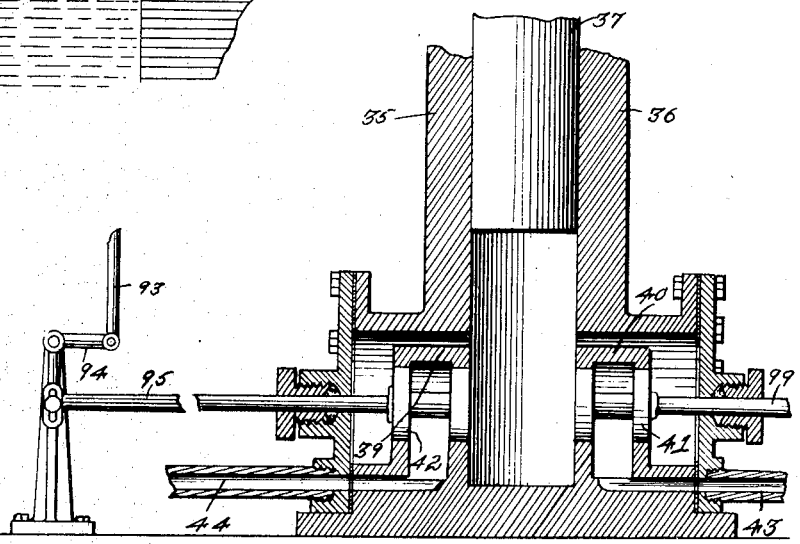
Figure 23 is a detail sectional view of the lower end of one of the hydraulic lifts showing the valve mechanism mounted therein.

For automatically elevating the stack a desired amount, I have provided a shoe 89 shown in detail in Figure 24, and mounted on the outer end of a lever 90 having one end pivoted to a bracket 91. The said shoe 89 is provided with a curved side and end portion 92. The lever 90 is provided with a downwardly extending rod 93, the lower end of which is operatively connected with a bell crank lever 94 having its free end connected with a connecting rod 95 designed to operate the intake valve 39.

It will be seen that when the shoe 89 is elevated or lowered, the valve 39 will be opened or closed, the said valve being closed when the shoe is in its elevated position.

When the pallet has been moved entirely off of the stack and onto the conveyor 33, the shoe 89 will then drop a distance equal to the thickness of the pallet, permitting the intake valve 39 to be moved to its open position, which will permit the fluid of the hydraulic lift to enter beneath the plunger 37 and cause the member 38 to be elevated, which in turn will cause the shoe 89 to be elevated and the valve 39 closed. This operation will continue until the last one of the pallets on the member 38 has been partially moved therefrom, at which time a second shoe 96 will be permitted to drop.

The said shoe 96 is similar to the shoe 89 and provided with a downwardly extending rod 97 which will actuate the bell crank lever 98 and the connecting rod 99 of the exhaust valve 41. This will permit the plunger 37 to lower and with it the head 38 until they have reached their lower limit of movement. The plunger 37 is supported by a collar 100 engaging the upper end of the said plunger, and a new stack will be permitted to enter, the same being moved in sideways and as the stack enters, the member 96 will be elevated and the exhaust valve 41 closed.

In this connection it should be noted that the member 96 should be so adjusted that it may be elevated a slight amount without opening the valve 41 so that moving the pallets from the stack will not open the valve 41.

The stacks are moved into operative position beneath the plate 40ª by the following mechanism:

As before described, the tracks 27 are inclined a sufficient amount so that the stacks of pallets will move by gravity from the stacking device 26 to a position adjacent to the off-bearing mechanism. The movement of the stacks is limited by means of an escapement device 101 which consists of a pair of arms 102 which extend longitudinally with the tracks 27 and one adjacent to each end of the pallets.

The members 102 are mounted on a shaft 103 mounted in suitable bearings 104. The outer end of each of the members 102 is provided with an upwardly extending projection 104ᵇ and 104ª designed to enter notches 105 in the ends of the pallets, shown in Figures 1 and 4. The shaft 103 is provided with an arm 106, one end of which is provided with a roller 107 designed to be operated by means of a cam 108 secured to one side of the head 38, shown in Figures 2 and 4.

The cam 108 is provided with an outwardly extending lug 109 and a notch 110. The said roller 107 is designed to rest in the notch 110 when the member 38 is in its lower limit of movement, as clearly shown in Figure 4. The arms 102 at this time are so arranged that the outer one of the members 104 will enter the notch 105 of the pallets in such a manner that the stack of pallets on the tracks 27 will be limited against further movement toward the off-bearing mechanism. As the head 38 is being elevated, the cam 108 will be elevated and also the free end of the arm 106, causing the members 102 to be locked and placed in an opposite inclined position, causing the projections 104ᵇ to disengage the pallets. The entire stacks of pallets will then move forwardly by gravity until they engage the projection 104ª and will rest in that position until the head 38 has again been lowered, at which time the lug 109 will engage the roller 107, causing the member 102 to again move to the position shown in Figure 4. This will cause the projection 104 to engage the second stack of pallets at the left as shown in Figure 4 and to release the one adjacent to the head 38. The stack of pallets will then move to a position above the head 38 until they engage a stop plate 111.

By this arrangement it will be seen that stacks will be automatically and successively fed to position beneath the off-bearing mechanism and above the head 38.

I will now describe the mechanism for feeding the pallets to the kiln. It will be seen in Figure 1 that the advancing conveyor 29 is arranged in alinement with the conveyor 33 and adapted to receive the pallets as they are discharged therefrom. The conveyor 29 is mounted on sprocket wheels 112 and 113, the sprocket 112 being shown in detail in Figure 21. It will be noted in the said figure that the conveyor 29 is provided with a series of upwardly extending lugs 114 which are spaced apart on the conveyor 29 a distance slightly greater than the length of one of the pallets 11.

Figure 21:
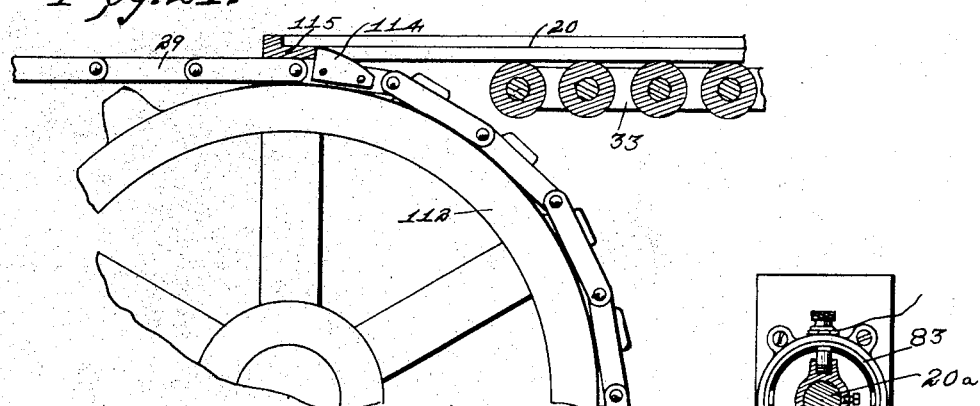
Figure 21 is a detail segmental sectional view showing the manner the pallets are engaged by the advancing chains.

The said lugs 114 are arranged to grasp one of the cross members 115 of the pallets 11, as clearly illustrated in Figure 21. As the chain 29 is advanced, the pallet will be pulled on to the said chain, and rest thereon until it is delivered, as hereinafter described. The said chain is driven by means of the sprocket 113 mounted on a shaft 116 extending parallel with the rear end of the kiln. The shaft 113 has one end provided with a pinion gear 117 in mesh with a spur gear 118 rotatively mounted on a shaft 119.

The gear 118 forms a part of a magnetic clutch member shown in section in Figure 19. Rigidly secured to the shaft 119 is a coacting clutch member 120. The said clutch member being of the electro magnetic type and being included in the electric circuit illustrated in Figure 17.

The shaft 119 is provided with a worm gear 121 operated from a worm 122 on a motor shaft 123. Said shaft 123 is continuously driven by a motor 124. Mounted adjacent to the front of the kiln 10 at one side of the forward end of the conveyor 29 I have provided an automatic switch 125 which comprises a stationary block 126 and a movable bell crank arm 127. One end of the arm 127 is provided with a contact member 128 to engage a contact 129 on the member 126. The other end of the bell crank lever is provided with a shoe 130 arranged in the path of the pallets 20 in such a manner that as the pallets are moved past the shoe 130, the contacts 128 and 129 will be closed. The said contacts are in a conductor member 131 of the circuit shown in Figure 17. The said circuit also includes conductors 132 and 133. The clutch member 118 is connected to the conductors 132 and 131.

By this arrangement it will be seen that if the switch 125 is closed by the pallet 11 being advanced from the conveyor 133 into engagement with the shoe 130, a current will be established through the clutch 118 and the shafts 119 operated, which in turn will cause the conveyor 29 to be advanced through the gears 117 and 118 of the shaft 116, the rear end of the shoe 130 being located at a point inside of the kiln, as clearly shown in Figure 1, and at such a point that when the pallet has been advanced past the said shoe, the shoe will be moved inwardly as it disengages the end of the pallet, said shoe being moved inwardly by means of a spring 134. This will cause the circuit to be broken and the shaft 116 stopped. The pallet will then rest in position where it may be moved transversely into the kiln.

It will be noted that the shoe 130 is of a considerable length, which is equal substantially to the thickness of the walls 12 of the kiln, so as to provide a space between the ends of the pallets as they rest on the conveyor 29.

Referring to Figure 16, the character A represents the pallet just mentioned which has passed the shoe 130. The character B represents the second pallet which is moved into position toward the pallet A, and it will be seen that as the left hand end of the pallet A engages the shoe, the shoe will be moved outwardly and an electric circuit established when the pallet has reached the position shown in dotted lines, which leaves a space between the pallets A and B equal to the thickness of the walls.

When this operation has taken place, the conveyor 29 is again advanced and the pallet A is moved into position in front of the second chamber of the kiln 10. This is repeated successively as each new pallet is moved into position until there is a pallet in front of each compartment of the kiln, and all of the positions have been filled, the last one of the pallets will engage a contact member 135, as illustrated in Figures 1 and 8. This consists of a pivoted lever 136 having a contact point 137 designed to engage the contact 138. The said switch 135 is included in the circuit illustrated in Figure 17, and in a conductor 139.

The said conductor 139 includes a magnetic clutch 140 similar to the clutch members 120, one member of which is mounted on the shaft 119. The other member is mounted on a shaft 141 in alinement with the shaft 119 and provided with a beveled gear 142 in mesh with a beveled gear 143 on a shaft 144 parallel with the front end of the kiln. Said shaft 144 is provided with a series of eccentrics 145 arranged in pairs, a pair for each of the kiln chambers. Each pair of eccentrics 145 has a pair of links 146 having one end pivotally mounted to a feeder bar 147.

When the member 135 has been actuated, a current will be established through the clutch 140 and the shaft 144 rotated, which in turn will cause the feeder bar 147 to be moved toward the kilns and engage the side of each of the pallets in front of them, causing the pallets to be moved from the conveyor 29 to the kiln conveyors 20. As soon as the pallets have been moved into position, the lever 136 will disengage the end of the pallet and will engage the end C of the feeder bar, which will maintain the points 137 and 138 in a closed position until the feeder bar 147 has returned to its normal position of movement, after which the lever 136 will be moved inwardly and the contacts broken, the lever being held in its open position by means of a spring 148.

Thus it will be seen that I have provided means whereby the pallets will be automatically received from the conveyor 33 and delivered to the compartments of the kiln 10.

It will further be seen that as the series of pallets are moved into position in the kiln, the other pallets will be crowded out of the kiln onto the conveyor 21, in which position they will rest until the shaft 116 is operated, at which time the conveyor 21 will also be operated through gears 149 and 25 and a shaft 24. The pallets are relieved of their load at the time they rest on the conveyor 21. They will then be discharged to the stacking mechanism 26.

In the rear end of the kiln and opposite each compartment therein, I have provided the outlet door openings 19, each of which is provided with a door 153 slidably mounted in suitable bearings 154. Each of the doors is provided with a pair of cables 155 extending over suitable pulleys 156 and attached to a common cable 157 extending along the front end of the kiln to a lever 158, one end of which is provided with a roller 159 operatively connected with a cam 160 on the shaft 144. This cam is shown in detail in Figure 9.

It will be seen that just at the time the pallets are being crowded out of the kiln a hump 161 of the cam 160 will engage the roller 159 causing the cable 157 to be pulled forwardly and the doors 153 to be simultaneously elevated until the pallet has been moved to position on the conveyor 21, after which the doors will be automatically closed at the time the pallet is being discharged from the kiln, for the purpose of preventing the escape of heated air at that end of the kiln.

The mechanism for stacking the pallets will now be described:

Referring to Figure 3, the numeral 162 represents a hydraulic cylinder which is provided with a plunger 163, the upper end of which is provided with a head 164 adjacent to each end of which is a short track 165 designed to aline with the tracks 27 when the head 164 is at its elevated position of movement.

The bottom end of the member 162 is provided with valve chambers 166 and 167, the said valve chambers being provided with valve devices similar to those previously described in the member 35. The chamber 166 is designed to accommodate the intake valve and the chamber 167 the exhaust valve. The intake valve is provided with a stem 168 actuated by a bell crank 169 having an upwardly extending rod 170, the upper end of which is provided with a lug 171.

Slidably mounted on the rod 170 is a sleeve 172 supported by means of a bracket 173 depending from the head 164. The sleeve 172 is designed to slide on the rod 170, while the head 164 is elevated or lowered for the purpose hereinafter described.

It will be seen that when the head 164 is in its elevated position, it will engage the lug 171, causing the rod 170 to be elevated and the valve rod 168 to be moved inwardly and the valve moved to a closed position. When the head 164 is at its lower limit of movement, the intake valve will be moved in the opposite direction or to an open position.

The member 162 is so located that when the head 164 is in an elevated position it will be in alinement with the conveyor 21 to receive pallets discharged therefrom with the tracks 165 in alinement with the tracks 27.

Between the head 164 when it is in its elevated position and the end of the discharge end of the conveyor 21 is a short section of a roller conveyor 174. By this arrangement it will be seen that the pallets will be discharged from the conveyor 21 to a position on the conveyor 174 with its forward end extending over the top of the head member 164 with the forward end of the pallet slightly beyond the vertical center of the member 162.

For drawing the pallets centrally above the said head 164 and alining them with each other, I have provided a magnetic clutch member 175, see Figure 6, similar to the magnetic clutch 50, the said clutch being mounted on a bracket 176. The said bracket is supported by a sleeve 177 slidably but non-rotatively mounted on a shaft 178, which is in turn rotatively mounted in bearing members 179 and at an angle with the longitudinal dimensions of the pallet, and above the back edge of said pallet. The shoes of the clutch 175 are supported normally in a horizontal position just above the top face of the pallet and arranged to grip the same when an electric current is established through said clutch member.

Pivotally mounted to the clutch is a link 180 secured to the crank 181 of the crank shaft 182. The shaft 182 is provided with a magnetic clutch 183 by means of which the crank 181 may be rotated one revolution and stopped by means of a motor 184. This mechanism is similar to those previously described.

By this arrangement it will be seen that if the crank 181 is rotated, the clutch 175 will be moved in a path parallel with the rod 178 and at an angle to the line of movement of the pallets as they are moved above the head 164. When this movement takes place the clutch 175 is magnetized and grips the pallet, causing it to be moved from the position shown at the top of Figure 3, to the position shown in Figure 6, with the forward end of the pallet against the stop plate 185 and the back edge adjacent to a stop plate 186.

When a pallet has been moved into the position shown in Figure 3, its forward end engages a trip device 187 included in the circuit illustrated in Figure 17, and included in conductors 188 and 189, the said conductors including a contact ring 190 operated by means of the crank wheel 181 so as to break the circuit when the wheel has established one revolution. The clutch 183 is also included in this circuit.

The magnet 175 is in a conductor 191 which shunts the clutch 183 and the member 190 and includes a contact ring 192 so arranged that contact is established when the device is in its normal position, and will be broken when the member 175 has reached its limit of movement, or when the crank 181 has passed through one-half revolution. This permits the clutch 175 to be released and free to move rearwardly or to the left as shown in Figure 6 without moving the pallet. When the pallet has been moved to position, its forward end engages a trip 193 mounted on the upper end of a vertical shaft 194 shown in Figures 3 and 6. The said trip is slidably but non-rotatively mounted thereon and of a sufficient weight that it will move to its lower position of movement by gravity adjacent to the bearing member 195.

The movement of the trip 193 causes the shaft 194 to be rocked, and an exhaust valve stem 196 to be actuated throwing the exhaust valve open. The said valve stem 196 is held to its normal closed position by means of a spring 197. As soon as the exhaust valve is opened the head 164 will be lowered until the forward end of the pallet above the head 164 disengages the trip 193 by being lowered beneath it. This permits the trip to move again to its normal position by the action of the spring 197 and the exhaust valve stem 196 moved to a closed position.

By this arrangement it will be seen that the head 164 will be moved downwardly a distance equal to the thickness of the pallet with the sleeve 172 moving downwardly along the rod 170. These operations will be repeated until the said sleeve 172 has engaged a lug 198 on said rod and moved the inlet valve rod 168 to an open position, after which time the operating fluid for the hydraulic lift will cause the plunger 163 together with the stack of pallets to be elevated until the sleeve 172 engages the member 171, closing the inlet valve just at the time when the tracks 165 are moved in alinement with the tracks 27, and the stack of pallets will move onto the track 27 by gravity. The members 165 are placed on a slight incline. The stack is supported on the head 164 against forward lateral movement by a plate 199 which extends downwardly between the track members 165.

It will be seen that as the stack is moved upwardly, the forward end of the upper one of the pallets will rest beneath the trip 193, and the trip will be moved upwardly until the stack has been moved from beneath the same onto the tracks 27, after which the said trip member will fall by gravity to its original position.

As the stack is also elevated, the top one of the pallets will engage an actuating arm 200 mounted on one end of the shaft 178, causing the shaft to rotate and the clutch 175 to rotate to a position where the shoes will be substantially in a vertical plane adjacent to the back edge of the stack. The clutch will be held in the said vertical position as the stack is being lowered by the arm 200 engaging the rear edge of the pallets. As soon as the stack has been discharged to the track 27, the clutch will again move to its horizontal working position.

Thus it will be seen that I have provided a mechanism for handling tile bearing pallets capable of handling a series of pallets in a continuous manner and to stack a portion of the same in a series of stacks so that a surplus may be provided in case the tile machine should break down and the delivery portion of the mechanism would be permitted to operate by manually actuating the contact switch 201 shown in the diagram in Figure 17. The pallets are fed onto the conveyor 21 by the operator manually opening the doors 153 and reaching in through the door opening and pulling the pallets to position on the conveyor 21, after which they will be automatically stacked and delivered as previously described.

It is believed that the general description of the operation of the machine has been thoroughly disclosed in the various steps and need not be repeated.

By providing a device of this nature, it will be seen that I have eliminated a large amount of manual labor which is necessary in operating plants of this character, and will thereby be able to operate these plants at a considerable saving inasmuch as a large amount of the cost of production of tile and building blocks consists in the labor involved.

It will also be seen that various mechanical devices might be substituted for those described herein without altering the general plan of my invention.

I claim as my invention:

1. In combination with the off-bearing mechanism of a tile cutter and a drier kiln provided with an inlet and outlet opening, a stack of pallets, means for successively advancing the pallets from said stack to a receiving position on said off-bearing mechanism, a stacking mechanism, means for advancing the pallets to position in front of said inlet openings, means for advancing the pallets through said kiln through the outlet openings, means for advancing the pallets from said outlet opening to said stacking mechanism, and means for advancing the stacks of pallets to the first said operative position.

2. In combination with the off-bearing mechanism of a tile cutter and a drier kiln provided with an inlet and outlet opening, a pallet feeding mechanism, a stack of pallets in operative relation therewith, a roller conveyor, said feeding mechanism being adapted to successively advance pallets in position for receiving tile from said off-bearing mechanism and to said roller conveyor, a pallet advancing conveyor, a receiving conveyor, a stacking mechanism, an accumulator conveyor, means for automatically delivering the pallets from said roller conveyor to said pallet advancing conveyor to position in front of said intake opening, means for moving said pallets through said kiln to said receiving conveyor, means for advancing said receiving conveyor to discharge the pallets to said stacking mechanism, means for delivering pallets from said stacking mechanism to said accumulator conveyor, and means for moving the stack of pallets from said accumulator conveyor to the said original operative position.

3. In combination with an off-bearing mechanism of a tile cutter, a drier kiln provided with a series of drier chambers, each of which is provided with an inlet and outlet opening, a stack of pallets, a receiving conveyor at the outlet openings of said kiln, stacking mechanism, an accumulator conveyor, means for successively advancing the pallets from said stack to operative relation with said off-bearing mechanism to receive tile therefrom and deliver the said pallets successively in receiving position to each of said inlet openings until each of said openings is provided with a pallet, and means for simultaneously advancing all of said pallets to said kiln and for discharging an equal number of pallets from said kiln to said receiving conveyor, means for advancing said receiving conveyor each time a pallet is moved into operative position from said stack, and to discharge pallets to said stacking mechanism, means for discharging the stacked pallets to said accumulator conveyor, means for automatically and successively moving the said stacks from said accumulator conveyor to the first said position.

4. The combination of an off-bearing mechanism of a tile cutter, a drier kiln having an inlet and an outlet opening, means for automatically and successively moving a series of pallets from a predetermined inoperative position to an operative position for receiving tile from said off-bearing mechanism and delivering them to said kiln, thence through said kiln and to the said starting point, said means including means for automatically stacking the pallets in piles, means for accumulating the piles of stacks, and means for automatically advancing the stack of pallets to the first said position when the last one of the pallets has been consumed from the preceding stack.

5. In combination with the off-bearing mechanism of a tile cutter, a drier kiln, said kiln including an inlet and outlet opening, a stack of pallets located in operative relation with said off-bearing mechanism, means for advancing pallets successively to the delivery position of said off-bearing mechanism to the inlet opening of said drier kiln, means for automatically moving the pallets to said drier kiln and through the discharge openings, means for delivering the pallets from the discharge opening to the first said position, a door for said discharge opening, and means automatically operated for opening said door when the pallet is being discharged, and for closing it as soon as the pallet has been discharged.

6. In combination with the off-bearing mechanism of a tile cutter, a drier kiln having an inlet and an outlet opening, a pallet advancing conveyor in front of said inlet openings, a receiving conveyor in alinement with said outlet opening, a kiln feeding mechanism, a stacking mechanism, an accumulator conveyor designed to receive a series of stacks of pallets, means for advancing one of said stacks of pallets to operative position beneath said off-bearing mechanism, means for successively advancing the pallets from said stack, a pallet advancing conveyor, means for simultaneously operating said advancing conveyor and said receiving conveyor, means for operating said kiln feeding mechanism to move the pallets from said advancing conveyor to said kiln and from said kiln to said receiving conveyor, means for receiving the pallets from said receiving conveyor and stacking them and delivering the stacked pallets to said accumulator conveyor.

7. In combination with an off-bearing mechanism of a tile cutting mechanism and a drier kiln having an inlet and an outlet opening, an accumulator conveyor for receiving a stack of pallets, a pallet feeding mechanism, means for advancing the stack of pallets into operative relation with said pallet feeding mechanism, said feeding mechanism being adapted to successively feed the pallets to operative position for receiving tile from said off-bearing mechanism, means for advancing said pallets to the inlet opening of said kiln, means for automatically moving the pallets through said kiln, and means for automatically delivering the pallets from said kiln to said accumulator conveyor, said means including a stacking mechanism, said stacking mechanism including means for alining the pallets as they are being stacked.

8. In combination with an off-bearing mechanism of a tile cutting machine and a drier kiln having an inlet and an outlet opening, a conveyor in said kiln designed to move a pallet from the inlet opening to the outlet opening, a pallet feeding mechanism, an accumulator conveyor, a series of stacks of pallets on said accumulator conveyor, means for automatically and successively delivering the stack of pallets from said accumulator conveyor to said feeding mechanism, means for successively moving the pallets from said feeding mechanism to receive tile from said off-bearing mechanism, means for automatically advancing pallets to position in the inlet opening in said kiln, a stacking mechanism, and means for delivering a pallet from the outlet opening of said kiln to said stacking mechanism.

9. In combination with an off-bearing mechanism of a tile cutting machine and a drier kiln having an inlet and an outlet opening, a stack of pallets formed of magnetic material, magnetic means for successively engaging the pallets of said stack and feeding them to a receiving position on said off-bearing mechanism to receive tile therefrom, means for advancing pallets to the inlet opening of said kiln, means for automatically moving said pallets through the kiln to said outlet opening, a receiving conveyor, means for moving the pallets from said outlet opening to said receiving conveyor, a stacking mechanism, an accumulator conveyor for receiving the stacked pallets, said stacking mechanism including electro-magnetic means for gripping the pallets and placing them in alinement.

10. A drier kiln having an inlet and an outlet opening, a series of pallets, means for successively advancing the pallets to a position in front of said inlet opening, means for advancing the pallets through said kiln to the outlet opening and to discharge them to the exterior thereof, means for advancing said pallets after they have been discharged to the original position, the last said means including means for grouping the pallets in a closely related relation to each other.

11. In combination with an off-bearing mechanism of a tile cutting machine and a drier kiln having an inlet and an outlet opening, a stack of pallets formed of magnetic material, magnetic means for successively engaging the pallets of said stack and feeding them to a receiving position on said off-bearing mechanism to receive tile therefrom, means for advancing pallets to the inlet opening of said kiln, means for automatically moving said pallets through the kiln to said outlet opening, a receiving conveyor, means for moving the pallets from said outlet opening to said receiving conveyor, a stacking mechanism, an accumulator conveyor for receiving the stacked pallets, said stacking mechanism including electro-magnetic means for gripping the pallets and placing them in alinement, said stacking means including hydraulic means for successively lowering the stack as each new pallet is positioned thereon, and hydraulic means for elevating the stack when a predetermined number has been placed thereon.

12. In combination with an off-bearing mechanism of a tile cutter, a drier kiln having an inlet and an outlet opening, means for automatically and successively moving a series of pallets from a stack of pallets to an operative position for receiving tile from said off-bearing mechanism and delivering them to said kiln, thence through said kiln and thence to said starting point, said means including means for automatically stacking the pallets in piles.

13. In combination with an off-bearing mechanism of a tile cutter, a drier kiln having an inlet and an outlet opening, means for automatically and successively moving a series of pallets from a stack of pallets to an operative position for receiving tile from said off-bearing mechanism and delivering them to said kiln, thence through said kiln and thence to said starting point, said means including means for automatically stacking the pallets in piles, and means for accumulating the piles of stacks.

14. In combination with an off-bearing mechanism of a tile cutter, a drier kiln having an inlet and an outlet opening, a pallet advancing conveyor in front of said inlet opening, a receiving conveyor in alinement with said outlet opening, means for feeding pallets through said kiln, and means for returning the pallets to first said conveyor, the last said means including a stacking mechanism.

15. In combination with an off-bearing mechanism of a tile cutting machine, a stack of pallets formed of magnetic material, magnetic means for successively engaging the pallets of said stack and feeding them to a receiving position on said off-bearing mechanism to receive tile therefrom.

16. In a device of the class described, means for moving a series of pallets successively from a receiving position to a delivery position, means for stacking the pallets as they are received in said delivery position, means for accumulating the stacks of pallets, and means for successively delivering said stacks of pallets to the said receiving position.

HALVER R. STRAIGHT.